United States Patent
Cho

(10) Patent No.: US 10,868,311 B2
(45) Date of Patent: Dec. 15, 2020

(54) MEMBRANE-ELECTRODE ASSEMBLY FOR FUEL CELL, METHOD FOR MANUFACTURING SAME, AND FUEL CELL SYSTEM COMPRISING SAME

(71) Applicant: KOLON INDUSTRIES, INC., Gwacheon-si (KR)

(72) Inventor: Dong Jun Cho, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 67 days.

(21) Appl. No.: 15/760,287

(22) PCT Filed: Sep. 23, 2016

(86) PCT No.: PCT/KR2016/010616
§ 371 (c)(1),
(2) Date: Mar. 15, 2018

(87) PCT Pub. No.: WO2017/052248
PCT Pub. Date: Mar. 30, 2017

(65) Prior Publication Data
US 2018/0269491 A1    Sep. 20, 2018

(30) Foreign Application Priority Data

Sep. 24, 2015  (KR) .................. 10-2015-0135270
Sep. 23, 2016  (KR) .................. 10-2016-0121831

(51) Int. Cl.
*H01M 4/88* (2006.01)
*H01M 8/04298* (2016.01)
(Continued)

(52) U.S. Cl.
CPC ......... *H01M 4/881* (2013.01); *H01M 4/8605* (2013.01); *H01M 4/8642* (2013.01);
(Continued)

(58) Field of Classification Search
None
See application file for complete search history.

(56) References Cited

U.S. PATENT DOCUMENTS

| 4,889,909 A | 12/1989 | Besecke et al. |
| 5,561,000 A | 10/1996 | Dirven et al. |

(Continued)

FOREIGN PATENT DOCUMENTS

| CN | 101000967 A | 7/2007 |
| CN | 102456891 B | 7/2014 |

(Continued)

OTHER PUBLICATIONS

Kisub Lee et al., "Development of High Performance MEA by Decal Method for PEM Fuel Cell", Journal of the Korean Hydrogen and New Energy Society, Oct. 2011, vol. 22, No. 5.

(Continued)

*Primary Examiner* — Sarah A. Slifka
(74) *Attorney, Agent, or Firm* — Harvest IP Law, LLP

(57) ABSTRACT

Disclosed are a membrane-electrode assembly for fuel cells, a method of manufacturing the same and a fuel cell system containing the same. The membrane-electrode assembly for fuel cells includes an anode and a cathode facing each other, and a polymer electrolyte membrane interposed between the anode and the cathode, wherein at least one of the anode and the cathode further includes a porous support and a catalyst layer for fuel cells disposed on one surface of the porous support. The electrode of the membrane-electrode assembly is a free-standing electrode, and the electrode has excellent adhesivity to the polymer electrolyte membrane and thus can prevent performance deterioration resulting from detachment of the electrode from the polymer electrolyte membrane during operation of fuel cells, and in particular, can (Continued)

secure high durability since the electrode is not readily detached even under harsh operation environments.

10 Claims, 4 Drawing Sheets

(51) Int. Cl.
　　　*H01M 4/92*　　　(2006.01)
　　　*H01M 8/1018*　　(2016.01)
　　　*H01M 4/86*　　　(2006.01)
　　　*H01M 8/1004*　　(2016.01)
　　　*H01M 8/1007*　　(2016.01)
　　　*H01M 8/0239*　　(2016.01)

(52) U.S. Cl.
　　　CPC ....... *H01M 4/8663* (2013.01); *H01M 4/8668* (2013.01); *H01M 4/8803* (2013.01); *H01M 4/8828* (2013.01); *H01M 4/92* (2013.01); *H01M 8/04298* (2013.01); *H01M 8/1004* (2013.01); *H01M 8/1007* (2016.02); *H01M 8/1018* (2013.01); *H01M 8/0239* (2013.01); *H01M 2008/1095* (2013.01); *Y02P 70/56* (2015.11)

(56) References Cited

U.S. PATENT DOCUMENTS

| | | | |
|---|---|---|---|
| 5,783,325 | A | 7/1998 | Cabasso et al. |
| 5,874,182 | A | 2/1999 | Wilkinson et al. |
| 2010/0159298 | A1 | 6/2010 | Haug |

FOREIGN PATENT DOCUMENTS

| | | | |
|---|---|---|---|
| CN | 104821404 | A | 8/2015 |
| JP | 09-202824 | A | 8/1997 |
| JP | 2005-183263 | A | 7/2005 |
| JP | 2006-172861 | A | 6/2006 |
| JP | 2008-004402 | A | 1/2008 |
| JP | 2009-199988 | A | 9/2009 |
| JP | 2012-064343 | A | 3/2012 |
| JP | 2012-243656 | A | 12/2012 |
| JP | 2014-17113 | A | 1/2014 |
| JP | 5435094 | B2 | 3/2014 |
| JP | 2014-098137 | A | 5/2014 |
| KR | 10-0531607 | B1 | 11/2005 |
| KR | 10-0660573 | B1 | 12/2006 |
| KR | 10-0813245 | B1 | 3/2008 |
| KR | 10-0884959 | B1 | 2/2009 |
| KR | 10-2009-0058406 | A | 6/2009 |
| KR | 10-1208314 | B1 | 12/2012 |
| KR | 10-1267905 | B1 | 5/2013 |
| KR | 10-1338588 | B1 | 12/2013 |
| KR | 10-1365955 | B1 | 2/2014 |
| KR | 10-1376362 | B1 | 3/2014 |
| KR | 10-1736533 | B1 | 5/2017 |
| WO | 01/37359 | A2 | 5/2001 |

OTHER PUBLICATIONS

International Search Report of PCT/KR2016/010616 dated Dec. 26, 2016 [PCT/ISA/210].

Chinese Office Action issued by the China Patent Office (CNIPA) dated Jun. 28, 2020.

MEMBRANE-ELECTRODE ASSEMBLY FOR FUEL CELL, METHOD FOR MANUFACTURING SAME, AND FUEL CELL SYSTEM COMPRISING SAME

CROSS REFERENCE TO RELATED APPLICATIONS

This application is a National Stage of International Application No. PCT/KR2016/010616, filed Sep. 23, 2016, claiming priorities based on Korean Patent Application Nos. 10-2015-0135270, filed Sep. 24, 2015 and 10-2016-0121831, filed Sep. 23, 2016, the contents of which are incorporated by reference in their entirety.

TECHNICAL FIELD

The present invention relates to a membrane-electrode assembly for fuel cells, a method of manufacturing the same and a fuel cell system comprising the same. More specifically, the present invention relates to a membrane-electrode assembly for fuel cells that can prevent performance deterioration which may result from detachment of the electrode from the polymer electrolyte membrane during operation of fuel cells due to excellent adhesion between the electrode and the polymer electrolyte membrane, in particular, can secure high durability since the electrode is not readily detached even under harsh operation environments, and can be manufactured by a simple process without using any decal film to reduce manufacturing costs, a method of manufacturing the same, and a fuel cell system comprising the same.

BACKGROUND ART

A fuel cell is an electric power generating system for directly converting chemical reaction energy of oxygen and hydrogen contained in a hydrocarbon-based material such as methanol, ethanol, or natural gas, into electric energy.

Such a fuel cell is a clean energy source, which can replace fossil energy, and has an advantage of providing a variety of ranges of power based on stack configuration via lamination of unit cells, and attracts much attention as a small portable power supply owing to 4 to 10-times higher energy density than small lithium batteries.

Representative examples of fuel cells include polymer electrolyte membrane fuel cells (PEMFCs) and direct oxidation fuel cells. A direct methanol fuel cell (DMFC) refers to a type of direct oxidation fuel cell which uses methanol as a fuel.

In such a fuel cell system, the stack actually generating electricity has a structure in which several to several dozen unit cells, each consisting of a membrane-electrode assembly (MEA) and a separator (also called a "bipolar plate"), are laminated. The membrane-electrode assembly has a structure in which a polymer electrolyte membrane including a hydrogen ion-conducting polymer is interposed between an anode (also called a "fuel electrode" or "oxidation electrode") and a cathode (also called an "oxidant electrode" or "reduction electrode").

At least one of the anode and the cathode is produced by coating a decal film with an electrode slurry in which a catalyst, binder and solvent are dispersed, transferring the dried electrode to a polymer electrolyte membrane and detaching the decal film.

However, the method using the decal film further requires a decal film for electrode coating and transfer, which is generally difficult to recycle. In addition, membrane-electrode assemblies manufactured by the decal method may be detached from polymer electrolyte membranes due to hot water and pressure of gas supplied and so on during operations of fuel cell stacks, which may cause performance deterioration.

PRIOR ART

Non-Patent Document

Kisub Lee et al 3, "Development of High Performance MEA by Decal Method for PEM Fuel Cell", Journal of The Korean Hydrogen and New Energy Society, Vol. 22, No. 5 (2011. October).

DISCLOSURE

Technical Problem

Therefore, the present invention has been made in view of the above problems, and it is one object of the present invention to provide a membrane-electrode assembly for fuel cells that can prevent performance deterioration which may result from detachment of the electrode from the polymer electrolyte membrane during operation of fuel cells due to excellent adhesion between the electrode and the polymer electrolyte membrane, in particular, can secure high durability since the electrode is not readily detached even under harsh operation environments, and can be manufactured by a simple process without using any decal film to reduce manufacturing costs.

It is another object of the present invention to provide a method of manufacturing the membrane-electrode assembly for fuel cells.

It is yet another object of the present invention to provide a membrane-electrode assembly and a fuel cell system comprising the membrane-electrode assembly for fuel cells.

Technical Solution

In accordance with the present invention, the above and other objects can be accomplished by the provision of a membrane-electrode assembly for fuel cells including an anode and a cathode facing each other, and a polymer electrolyte membrane interposed between the anode and the cathode, wherein at least one of the anode and the cathode further includes a porous support and a catalyst layer for fuel cells disposed on one surface of the porous support.

At least one of the anode and the cathode may be disposed such that the other surface of the porous support on which the catalyst layer is not disposed faces the polymer electrolyte membrane.

The catalyst layer may be disposed on the surface of the porous support.

The catalyst layer may permeate the porous support while filling inner pores of the porous support.

The catalyst layer may include a catalyst and a binder resin.

The porous support may include a first region where the catalyst and the binder resin of the catalyst layer permeate, and a second region where only the binder resin of the catalyst layer permeates.

The first region of the porous support may be disposed under the catalyst layer and the second region of the porous support may be disposed under the first region of the porous support.

The polymer electrolyte membrane may be disposed under the second region of the porous support.

A ratio of a total thickness of the catalyst layer and the first region to a thickness of the second region may be 1:1 to 10:1.

A content of the binder resin in the catalyst layer may be 20 to 40% by weight with respect to the total weight of the catalyst layer.

A content of the binder resin in the first region may be 20 to 40% by weight with respect to the total weight of the first region.

A mean size of pores of the porous support may be 300 nm to 100 nm, a mean particle diameter of the catalyst may be 450 nm to 250 nm, and a mean particle diameter of the binder resin is 250 nm to 50 nm.

The porous support may include an expanded polytetrafluoroethylene (e-PTFE) polymer.

The porous support may include any one selected from the group consisting of carbon paper, carbon cloth, carbon felt and carbon fiber.

The porous support may include a nanoweb in which nanofibers are integrated in the form of a non-woven fabric including a plurality of pores.

The nanofibers may include any one selected from the group consisting of nylon, polyimide, polyaramid, polyetherimide, polyacrylonitrile, polyaniline, poly(ethylene oxide), polyethylene naphthalate, poly(butylene terephthalate), styrene butadiene rubber, polystyrene, polyvinyl chloride, polyvinyl alcohol, polyvinylidene fluoride, polyvinyl butylene, polyurethane, polybenzoxazole, polybenzimidazole, polyamide-imide, polyethylene terephthalate, polyethylene, polypropylene, a copolymer thereof, and a mixture thereof.

The nanoweb may be manufactured by electrospinning.

In another aspect of the present invention, provided is a method of manufacturing a membrane-electrode assembly for fuel cells including preparing a composition for forming a catalyst layer including a catalyst and a binder resin, coating one surface of a porous support with the composition for forming the catalyst layer, to form the catalyst layer, and disposing the catalyst layer such that the other surface of the porous support on which the catalyst layer is not disposed faces the polymer electrolyte membrane.

The composition for forming the catalyst layer may further include permeating the composition for forming the catalyst layer while filling inner pores of the porous support.

In the composition for forming the catalyst layer, the binder resin may permeate to the entire depth of the porous support and the catalyst may permeate only to a partial depth of the porous support.

In yet another aspect of the present invention, provided is a fuel cell system comprising a fuel supply for supplying a fuel mixture of fuel and water, a modifier for modifying the fuel mixture to generate a modification gas including hydrogen gas, a stack including the membrane-electrode assembly and generating electric energy by electrochemical reaction between the modification gas including hydrogen gas supplied from the modifier with an oxidant, and an oxidant supply for supplying the oxidant to the modifier and the stack.

Effects of the Invention

The membrane-electrode assembly for fuel cells according to the present invention includes a free-standing electrode, and the electrode has excellent adhesivity to the polymer electrolyte membrane and thus can prevent performance deterioration resulting from detachment of the electrode from the polymer electrolyte membrane during operation of fuel cells, and in particular, can secure high durability since the electrode is not readily detached even under harsh operation environments. Using the electrode, the membrane-electrode assembly for fuel cells can be manufactured by a simple process without using any decal film and manufacturing costs can be reduced.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, embodiments of the present invention will be described in more detail. These embodiments are provided only for illustration and should not be construed as limiting the present invention. The present invention is only defined by the scope of claims described later.

Unless specifically mentioned otherwise herein, it will be understood that when an element such as a layer, film, region or substrate is referred to as being "on" another element, it can be directly on the other element or an intervening element may also be present between the elements.

The membrane-electrode assembly for fuel cells according to one embodiment of the present invention may include a cathode and an anode which face each other, and a polymer electrolyte membrane interposed between the cathode and the anode, and at least one of the anode and the cathode may further include a porous support and a catalyst layer for fuel cells disposed on one surface of the porous support.

Figure 1:
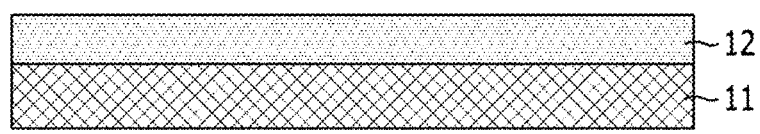
FIGS. 1 and 2 are sectional views schematically illustrating different examples of an electrode for fuel cells according to an embodiment of the present invention.
Figure 2:

FIGS. 1 and 2 are sectional views schematically illustrating different examples of an electrode for fuel cells according to an embodiment of the present invention. Hereinafter, the electrode for fuel cells will be described with reference to FIGS. 1 and 2.

The electrode for fuel cells 10 includes a porous support 11, and a catalyst layer 12 disposed on one surface of the porous support 11.

Any porous material may be used as the porous support 11 so long as it includes a plurality of pores.

The porous support 11 is one element of the electrode 10 which is bonded to the polymer electrolyte membrane and improves durability of the electrode 10 compared to conventional electrodes, and the electrode 10 including the porous support 11 is a self-standing electrode which enables the electrode 10 to be stably handled during production of the membrane-electrode assembly. Meanwhile, the feature of the present invention that the porous support 11 has neither electrical conductivity nor a gas diffusion layer is different from that of conventional fuel cells using a gas diffusion layer (GDL). Furthermore, the electrode 10 including the porous support 11 according to the present invention may further include a separate gas diffusion layer.

In one embodiment of the present invention, the porous support 11 may include a perfluorinated polymer which exhibits excellent resistance against thermal and chemical decomposition. For example, the porous support 11 may be a copolymer of polytetrafluoroethylene (PTFE) or tetrafluoroethylene, and $CF_2=CFC_nF_{2n+1}$ (n is an integer of 1 to 5) or a compound represented by the following Formula 1:

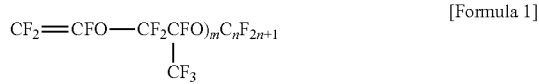
[Formula 1]

In Formula 1, m is an integer of 0 to 15 and n is an integer of 1 to 15.

PTFE is commercially available and is suitable as the porous support 11. In addition, microstructures of polymer fibrils, or expanded polytetrafluoroethylene (e-PTFE) polymers having microstructures in which nodes are mutually connected via fibrils may also be suitably used for the porous support 11, and membranes having microstructures of polymer fibrils having no nodes may be also suitable used as the porous support 11.

The porous support 11 including the perfluorinated polymer may be obtained by extrusion molding dispersion-polymerized PTFE on a tape in the presence of a lubricant and subjecting the resulting material to orientation to obtain a porous support with higher porosity and higher strength. In addition, the amorphous content of PTFE can be improved by thermally treating the e-PTFE at a temperature exceeding the melting point (about 342° C.) of the PTFE. The e-PTFE film manufactured by the method may have micropores with various diameters and porosity. The e-PTFE film manufactured by the method may have a porosity of at least 35%, and the micropores may have a diameter of about 0.01 to 1 μm. In addition, the thickness of the porous support 11 including the perfluorinated polymer may vary, but is for example 2 μm to 40 μm, preferably 5 μm to 20 μm. When the thickness of the porous support 11 is less than 2 μm, mechanical strength may be significantly deteriorated and, when the thickness exceeds 40 μm, resistance loss may be increased, and weight reduction and integration may be deteriorated.

In another embodiment of the present invention, the porous support 11 may include a nanoweb in which nanofibers are integrated in the form of a non-woven fabric having a plurality of pores.

The nanofibers are preferably hydrocarbon-based polymers which exhibit excellent chemical resistance and hydrophobicity and are thus free from a risk of deformation by moisture under high humidity environments. Specifically, the hydrocarbon-based polymer may be selected from the group consisting of nylon, polyimide, polyaramid, polyetherimide, polyacrylonitrile, polyaniline, poly(ethylene oxide), poly(ethylene naphthalate), poly(butylene terephthalate), styrene butadiene rubber, polystyrene, polyvinyl chloride, polyvinyl alcohol, polyvinylidene fluoride, polyvinyl butylene, polyurethane, polybenzoxazole, polybenzimidazole, polyamideimide, polyethylene terephthalate, polyethylene, polypropylene, a copolymer thereof, and a mixture thereof. In particular, preferred is polyimide which exhibits better heat resistance, chemical resistance and shape stability.

The nanoweb is an assembly of nanofibers in which nanofibers manufactured by electrospinning are randomly disposed. In this case, the nanofibers preferably have a mean diameter of 40 to 5,000 nm, wherein the mean diameter is calculated from the average of 50 fiber diameters in consideration of porosity and thickness of the nanoweb using a scanning electron microscope (JSM6700F, JEOL). When the mean diameter of the nanofibers is less than 40 nm, the mechanical strength of the porous support 11 may be deteriorated and when the mean diameter of the nanofibers exceeds 5,000 nm, porosity may be remarkably deteriorated and thickness may increase.

The nanoweb includes the nanofibers described above, so that it can have a porosity of 50% or more. As the nanoweb has a porosity of 50% or more, the specific surface area of the porous support 11 is increased, facilitating permeation of the catalyst layer 12. As a result, the efficiency of cells can be improved. Meanwhile, the nanoweb preferably has a porosity of 90% or less. When the nanoweb has a porosity higher than 90%, the subsequent process may not proceed efficiently due to deteriorated shape stability. The porosity may be calculated by the ratio of air volume in the nanoweb to the total volume of the nanoweb in accordance with the following Equation 1. In this case, the total volume is calculated by making a rectangular sample and measuring the width, length and thickness of the material, and the air volume can be obtained by measuring the weight of the sample and subtracting a polymer volume, calculated back from polymer density, from the total volume.

Porosity (%)=(Air volume in nanoweb/Total volume of nanoweb)×100   [Equation 1]

In addition, the nanoweb may have a mean thickness of 5 to 50 μm. When the thickness of the nanoweb is less than 5 μm, mechanical strength may be significantly deteriorated, on the other hand, when the thickness exceeds 50 μm, resistance loss may increase and weight reduction and integration may be deteriorated. More preferably, the nanoweb may have a mean thickness of 10 to 30 μm.

In another embodiment of the present invention, the porous support 11 may include any one selected from the group consisting of carbon paper, carbon cloth, carbon felt and carbon fiber.

The catalyst layer 12 may include a catalyst and a binder resin.

Any catalyst may be used as the catalyst used for the catalyst layer 12, so long as it participates in reaction with the fuel cell and can be used as a catalyst. Specifically, a metal catalyst, more specifically, a platinum-based catalyst is used.

The platinum-based catalyst may be selected from the group consisting of platinum, ruthenium, osmium, platinum-ruthenium alloys, platinum-osmium alloys, platinum-palladium alloys, platinum-M alloys (wherein M represents a transition metal selected from the group consisting of Ga, Ti, V, Cr, Mn, Fe, Co, Ni, Cu, Zn, Sn, Mo, W, Rh, Ru and an alloy thereof) and a mixture thereof.

The anode and cathode of the fuel cell may be the same material, but are more specifically selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni and Pt/Ru/Sn/W.

In addition, the metal catalyst may be used as a metal catalyst itself (black) and may be supported on a support.

The support may be a carbon-based material such as graphite, Denka black, Ketjen black, acetylene black, carbon nanotubes, carbon nanofibers, carbon nanowires, carbon nanoballs, and activated carbon or an inorganic particulate such as alumina, silica, zirconia or titania. However, in general, the support is a carbon-based material.

In case where a precious metal supported on the support is used as the catalyst, the precious metal supported on the support may be selected from commercially available products, or may be prepared by supporting the precious on the support. Since a process of supporting the precious metal on the support is well-known in the art, it could be readily understood by those skilled in the art, even though detailed explanation thereof is omitted.

The catalyst layer 12 may further include a binder resin in order to improve adhesion of the catalyst layer 12 and transfer of hydrogen ions.

The binder resin may be made of a polymer resin having the ability to conduct hydrogen ions. Representative examples include polymer resins having, at a side chain thereof, a cationic exchanger selected from the group consisting of a sulfonic acid group, a carboxylic acid group, a phosphoric acid group, a phosphonic acid group and a derivative thereof. More specifically, representative examples of the polymer resin include at least one of fluoro-based polymers, benzimidazole-based polymers, polyimide-based polymers, polyetherimide-based polymers, polyphenylene sulfide-based polymers, polysulfone-based polymers, polyether sulfone-based polymers, polyether ketone-based polymers, polyether-ether ketone-based polymers and polyphenylquinoxaline-based polymers. More specifically, representative polymer resins include one or more selected from poly(perfluorosulfonic acid), poly(perfluorocarboxylic acid), and copolymers of fluorovinyl ether and tetrafluoroethylene including sulfonic acid groups, polyetherketone sulfide, arylketone, poly(2,2'-(m-phenylene)-5,5'-bibenzimidazole) and poly(2,5-benzimidazole).

In addition, the polymer resin capable of conducting hydrogen ions can replace hydrogen (H) on the cationic exchange group on the side end thereof by Na, K, Li, Cs, or tetrabutylammonium. When the hydrogen (H) of the ion exchange group on the side end is replaced by Na, NaOH is used for replacement in the preparation of the catalyst composition, and when the hydrogen is replaced by tetrabutylammonium, tetrabutylammonium hydroxide is used for the replacement. K, Li, or Cs can be also replaced using a suitable compound. This replacement method is well-known in the art and detailed description thereof is thus omitted in the specification.

The binder resin may be used singly or as a mixture, and may be used optionally in combination with a non-conductive compound in order to further improve adhesion to the polymer electrolyte membrane. The amount of the non-conductive compound used is preferably controlled depending on application.

The non-conductive compound may include one or more selected from the group consisting of polytetrafluoroethylene (PTFE), a tetrafluoroethylene-hexafluoropropylene (FEP) copolymer, a tetrafluoroethylene-perfluoroalkylvinylether (PFA) copolymer, ethylene/tetrafluoroethylene (ETFE), an ethylenechlorotrifluoro-ethylene (ECTFE) copolymer, polyvinylidene fluoride, a polyvinylidene fluoride-hexafluoropropylene (PVdF-HFP) copolymer, dodecyl benzene sulfonate and sorbitol.

In this case, the catalyst layer 12 may be disposed on the surface of the porous support 11, as shown in FIG. 1, or may permeate into the porous support 11, while filling inner pores of the porous support 11, as shown in FIG. 2.

When the catalyst layer 12 fills inner pores of the porous support 11 and at the same time, permeates into the porous support 11, the porous support 11 may include a first region 13 where the catalyst and the binder resin of the catalyst layer 12 permeate, and a second region 14 where only the binder resin of the catalyst layer 12 permeates.

In this case, the catalyst layer 12 including the catalyst and the binder resin, and the first region 13 serve as electrode layers and the second region 14 including only the binder resin serves as an ion-conducting layer which transfers ions generated by the reaction.

That is, since the catalyst and the binder resin of the catalyst layer 12 differ in particle size or physical properties such as viscosity, they differ in levels of permeation into inner pores in the porous support 11. As a result, the binder resin having a smaller particle size than the catalyst can permeate into the porous support 11 more deeply.

For example, in order to produce the porous support 11 including the first region 13 and the second region 14, the mean pore size of the porous support 11 may be 300 nm to 100 nm, preferably 250 nm to 150 nm, and the mean particle diameter of the catalyst may be 450 nm to 250 nm, preferably 400 nm to 300 nm, and the mean particle diameter of the binder resin may be 250 nm to 50 nm, preferably 200 nm to 100 nm. For reference, the mean particle diameter of the catalyst may be a mean particle diameter of secondary particles where the precious metal catalyst supported on the support combines with the binder resin and then agglomerates therewith.

That is, when the mean size of pores of the porous support 11, the mean particle diameter of the catalyst and the mean particle diameter of the binder resin are within the ranges defined above, the binder resin solution (or dispersion) fills a deeper area of the porous support 11 due to filtering-like effects, and the catalyst may be formed as a thin layer on the surface of the porous support 11. That is, for the production of the porous support 11 including the first region 13 and the second region 14, in order for the catalyst and the binder resin to selectively permeate the porous support 11, preferably, the mean particle diameter of the catalyst is larger than the mean pore size of the porous support 11 and the mean pore size of the porous support 11 is larger than the mean particle size of the binder resin.

In the specification of the present invention, the depth of the porous support 11 is the same as the thickness of the porous support 11 and increases from one surface of the porous support 11 on which the catalyst layer 12 is disposed to another surface of the porous support 11 on which the catalyst layer 12 is not disposed.

Regarding the first region 13 and the second region 14 of the porous support 11, the first region 13 may be disposed under the catalyst layer 12 and the second region may be disposed under the first region 13, since the catalyst layer 12 permeates into the porous support 11 while filling inner pores from the one surface of the porous support 11.

The content of the binder resin in the catalyst layer 12 or the first region 13 may be 20 to 40% by weight with respect to the total weight of the catalyst layer 12 or the first region 13. When the content of the binder resin is less than 20% by weight, produced ions cannot be transferred well, and when the content exceeds 40% by weight, due to lack of pores, supply of hydrogen or oxygen (air) may be difficult and the active area to be reacted may be reduced.

The thickness of the catalyst layer 12, or the total thickness of the catalyst layer 12 and the first region 13 may be 1 to 100 μm, and the thickness of the second region 14 may be 1 to 10 μm. The thickness of the catalyst layer 12, or the total thickness of the catalyst layer 12 and the first region 13 may vary depending on the porosity of the porous support 11, and the thickness of the second region 14 is preferably as small as possible.

In addition, the thickness ratio of the catalyst layer 12 to the second region 14, or the thickness ratio of the total thickness of the catalyst layer 12 and the first region 13, to the second region 14 may be 1:1 to 10:1, preferably 4:1 to 2:1. When the ratio of the thickness of the catalyst layer 12 to the total thickness of the catalyst layer 12 and the first region 13 is less than 1, activity may be deteriorated due to small reaction area, and when the thickness ratio exceeds 10, movement distances of ions and electrons increase, and resistance may increase.

The electrode for fuel cells 10 includes the second region 14 composed of only the binder resin, the first region 13 composed of the binder resin and the catalyst, and the binder resin and the catalyst, so that the interface between the binder resin and the catalyst can be created in the form of a layer.

Meanwhile, the electrode for fuel cells 10 may further include an electrode substrate (not shown), if necessary. The electrode substrate functions to support the electrode 10 and to enable a fuel and an oxidizing agent to easily access the catalyst layer 12 by diffusing the fuel and the oxidizing agent into the catalyst layer 12.

The electrode substrate may be carbon paper, carbon cloth, carbon felt, carbon fiber or a combination thereof and preferably is carbon fiber.

The electrode substrate may include pores. In this regard, by controlling the size and porosity of the pores, functions of the fuel cell can be improved. Specifically, the electrode substrate may include mean pores with a diameter of 20 to 40 μm at a porosity of 30 to 80 vol % with respect to the total volume of the electrode substrate. Specifically, the electrode substrate may include mean pores with a diameter of 20 to 30 μm at a porosity of 50 to 80 vol % with respect to the total volume of the electrode substrate.

In addition, if necessary, the electrode for fuel cells 10 may further include a microporous layer (not shown) in order to improve diffusion of reactants.

The microporous layer may have a thickness of 3 to 80 μm, specifically a thickness of 10 to 70 μm.

When the thickness of the microporous layer is within this range, resistance increase resulting from mass transfer limitation derived from water flooding under a relative humidity of 80% can be prevented, and cracks or detachment which is caused by pressing of the channel of separation membrane by coupling pressure in the production of fuel cell stacks can be avoided.

The microporous layer may be a conductive powder having a small particle size, for example, carbon powder, carbon black, acetylene black, activated carbon, carbon fiber, fullerene, carbon nanotube, carbon nanowire, carbon nanohorn, carbon nanoring or a combination thereof.

The microporous layer can be produced by coating the electrode substrate with a composition including the conductive powder, a binder resin and a solvent.

The binder resin may be polytetrafluoroethylene, polyvinylidene fluoride, poly(hexafluoropropylene), polyperfluoroalkylvinylether, polyperfluoro sulfonylfluoride, alkoxyvinyl ether, polyvinylalcohol, cellulose acetate, a copolymer thereof, or the like. The solvent may be alcohol such as ethanol, isopropyl alcohol, n-propyl alcohol or butyl alcohol, water, dimethylacetamide, dimethylsulfoxide, N-methylpyrrolidone, tetrahydrofuran or the like.

The coating process may be carried out using screen printing, spray coating, coating using a doctor blade or the like depending on the viscosity of the composition, but the present invention is not limited thereto.

The method of manufacturing a membrane-electrode assembly for fuel cells according to one embodiment of the present invention includes preparing a composition for forming the catalyst layer including the catalyst and the binder resin, coating one surface of the porous support 11 with the composition for forming the catalyst layer to form a catalyst layer 12, and disposing the catalyst layer 12 such that the other surface of the porous support 11 on which the catalyst layer 12 is not disposed faces a polymer electrolyte membrane.

First, the composition for forming the catalyst layer including the catalyst and the binder resin is prepared.

The composition for forming the catalyst layer may be prepared by adding the catalyst and the binder resin to a suitable solvent, followed by mixing. The catalyst and the binder resin have been described above. The solvent may be alcohol such as ethanol, isopropyl alcohol, n-propyl alcohol, or butyl alcohol, water, dimethylacetamide, dimethylsulfoxide, N-methylpyrrolidone, tetrahydrofuran or the like.

Next, the catalyst layer 12 is formed by coating one surface of the porous support 11 with the prepared composition for forming the catalyst layer.

When one surface of the porous support 11 is coated with the composition for forming the catalyst layer, a part of the composition for forming the catalyst layer can permeate into the porous support 11 while filling the inner pores of the porous support 11.

At this time, as described above, the catalyst of the composition for forming the catalyst layer permeates only to a partial depth of the porous support 11, to form the first region 13, and the binder resin permeates to the entire depth of the porous support 11 to form the second region 14.

The coating process may be carried out using screen printing, spray coating, coating using a doctor blade or the like depending on the viscosity of the composition for forming the catalyst layer. Preferably, with spraying or dipping, it is possible to permeate the composition for forming the catalyst layer into the porous support 11, or using high-pressure spraying, it is possible to permeate the composition for forming the catalyst layer into the surface of the porous support 11.

Next, the catalyst layer 12 is disposed such that the other surface of the porous support 11 on which the catalyst layer 12 is not disposed faces the polymer electrolyte membrane.

The membrane-electrode assembly for fuel cells manufactured by the method includes the electrode for fuel cells 10.

Figure 3:
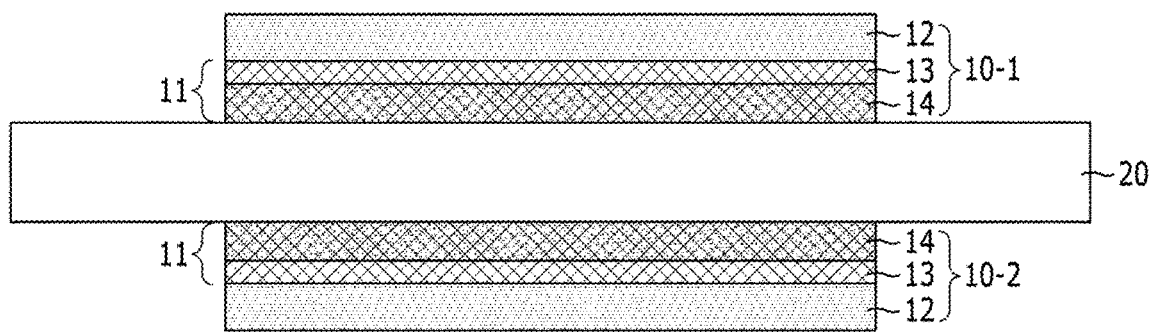
FIG. 3 is a sectional view schematically illustrating a membrane-electrode assembly according to another embodiment of the present invention.

FIG. 3 is a sectional view schematically illustrating a membrane-electrode assembly according to another embodiment of the present invention. Hereinafter, the membrane-electrode assembly will be described with reference to FIG. 3.

The membrane-electrode assembly 50 includes an anode 10-2 and a cathode 10-1 which face each other, and a polymer electrolyte membrane 20 disposed between the anode 10-2 and the cathode 10-1.

At least one of the anode 10-2 and the cathode 10-1 may be the electrode 10 described above.

At this time, at least one of the anode 10-2 and the cathode 10-1 may be disposed such that the other surface of the porous support 11 on which the catalyst layer 12 is not disposed faces the polymer electrolyte membrane. That is, the part of the second region 14 of the porous support 11 may face the polymer electrolyte membrane 20.

As a result, the second region 14 which only includes the binder resin, the first region 13, which includes the binder resin and the catalyst, and the catalyst layer 12, which includes the binder resin and the catalyst, and contains a higher amount of the catalyst than the first region 13 are sequentially laminated on the polymer electrolyte membrane 20. That is, the polymer electrolyte membrane 20 may be disposed under the second region 14 of the porous support 11.

The polymer electrolyte membrane 20, which is a solid polymer electrolyte having a thickness of 10 to 200 μm, has an ion exchange function of transferring hydrogen ions generated in the catalyst layer 12 of the anode 10-2 to the catalyst layer 12 of the cathode 10-1.

Figure 4:
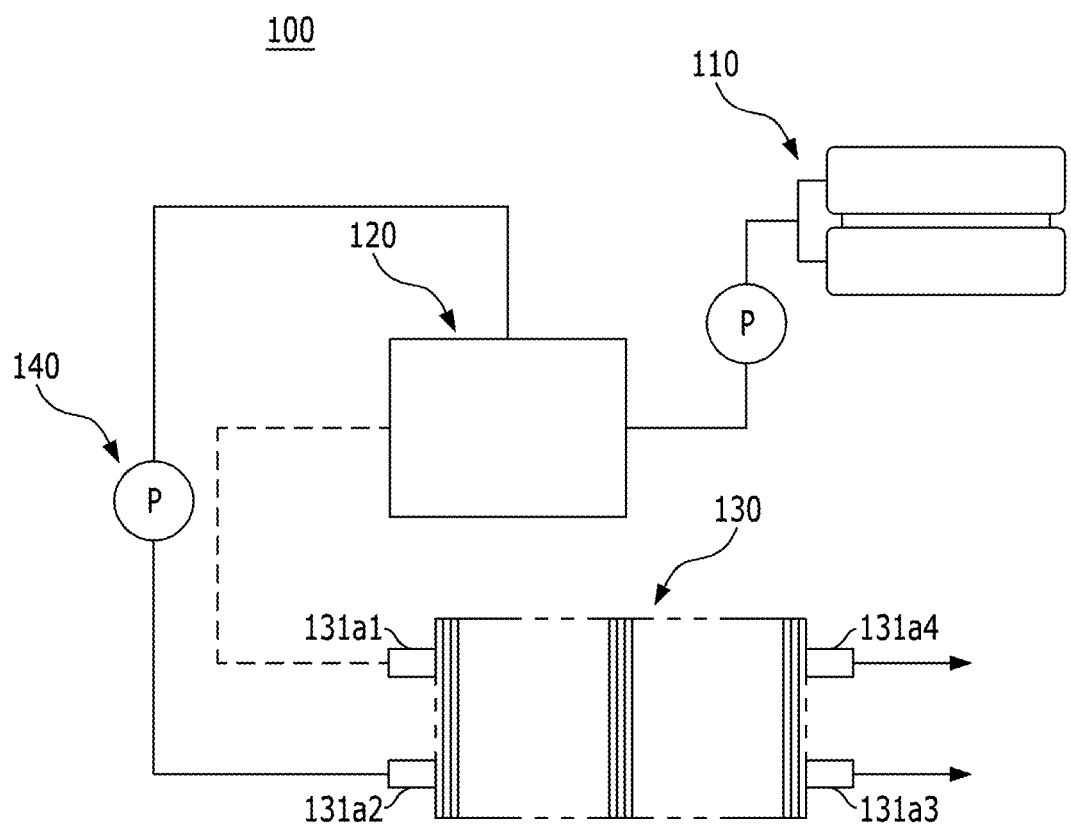
FIG. 4 is a schematic diagram illustrating the overall configuration of the fuel cell system according to another embodiment of the present invention.

In another embodiment of the present invention, the present invention provides a fuel cell system comprising the membrane-electrode assembly 50. FIG. 4 is a schematic diagram illustrating the overall configuration of the fuel cell system according to another embodiment of the present invention.

Referring to FIG. 4, the fuel cell system 100 includes a fuel supply 110 for supplying a fuel mixture of a fuel and water, a modifier 120 for modifying the fuel mixture to generate a modification gas including hydrogen gas, a stack 130 for generating electric energy by electrochemical reaction between the modification gas including hydrogen gas supplied from the modifier 120, and an oxidant, and an oxidant supply 140 for supplying the oxidant to the modifier 120 and the stack 130.

The stack 130 includes a plurality of unit cells which generate electrical energy by inducing oxidation/reduction between the modification gas including hydrogen gas supplied from the modifier 120 and the oxidant supplied from the oxidant supply 140.

Each unit cell refers to a cell of a unit for generating electricity and includes the membrane-electrode assembly 50 for oxidizing/reducing oxygen in the modification gas including hydrogen gas, a separator (or also called a "bipolar plate") for supplying the modification gas including hydrogen gas and the oxidant to the membrane-electrode assembly 50. The separator is disposed at opposite sides of the membrane-electrode assembly 50. In this case, the separator disposed at the outermost size of the stack may specifically be called the "end plate".

One end plate of the separator includes a first supply pipe 133a1 having a pipe shape for injecting a modification gas including hydrogen gas supplied from the modifier 120, and a second supply pipe 133a2 having a pipe shape for injecting oxygen gas, and another end plate includes a first discharge pipe 133a3 for discharging the modification gas residue including hydrogen gas remaining after reaction in a plurality of unit cells to the outside, and a second discharge pipe 133a4 for discharging the oxidant remaining after reaction in the unit cells to the outside.

MODE FOR THE INVENTION

Now, specific examples of the present invention will be described in more detail. However, the following examples are provided only for illustrative purpose and should not be construed as limiting the scope of the present invention.

In addition, the content not described herein will be technically conceived by those skilled in the art and detailed explanation thereof will be thus omitted.

Example 1: Production of Membrane-Electrode Assembly 100 parts by weight of a catalyst, Pt—Ru/C catalyst (commercially available from Tanaka Chemical Corporation) and 900 parts by weight of a PFSA binder (Nafion 5% solution, commercially available from DuPont) and water as a solvent were charged in a vial, followed by stirring and dispersing by ultrasonication, to prepare a composition for forming the catalyst layer. At this time, the mean particle diameter of the catalyst was 350 nm, and the mean particle diameter of the PFSA binder was 150 nm. At this time, the mean particle diameter of the catalyst was a mean particle diameter of secondary particles where the Pt—Ru/C catalyst combines and agglomerates with the PFSA binder.

An e-PTFE porous support (mean pore size: 200 nm) was evenly spread and uniformly coated with the prepared composition for forming the catalyst layer. At this time, the PFSA polymer contained in the binder filled the entire pores of the porous support and permeated only the surface of the catalyst. At this time, the content of the binder resin in the catalyst layer was about 28.5% by weight.

The porous support provided with the catalyst layer was dried, and the resulting free-standing electrode sheet was cut into a suitable size, arranged on and bonded to both surfaces of a fluorinated polymer electrolyte membrane (DuPont product; Nafion 115 Membrane) and then hot-pressed at a temperature of 135° C. for 3 minutes to manufacture a membrane-electrode assembly.

Figure 5:
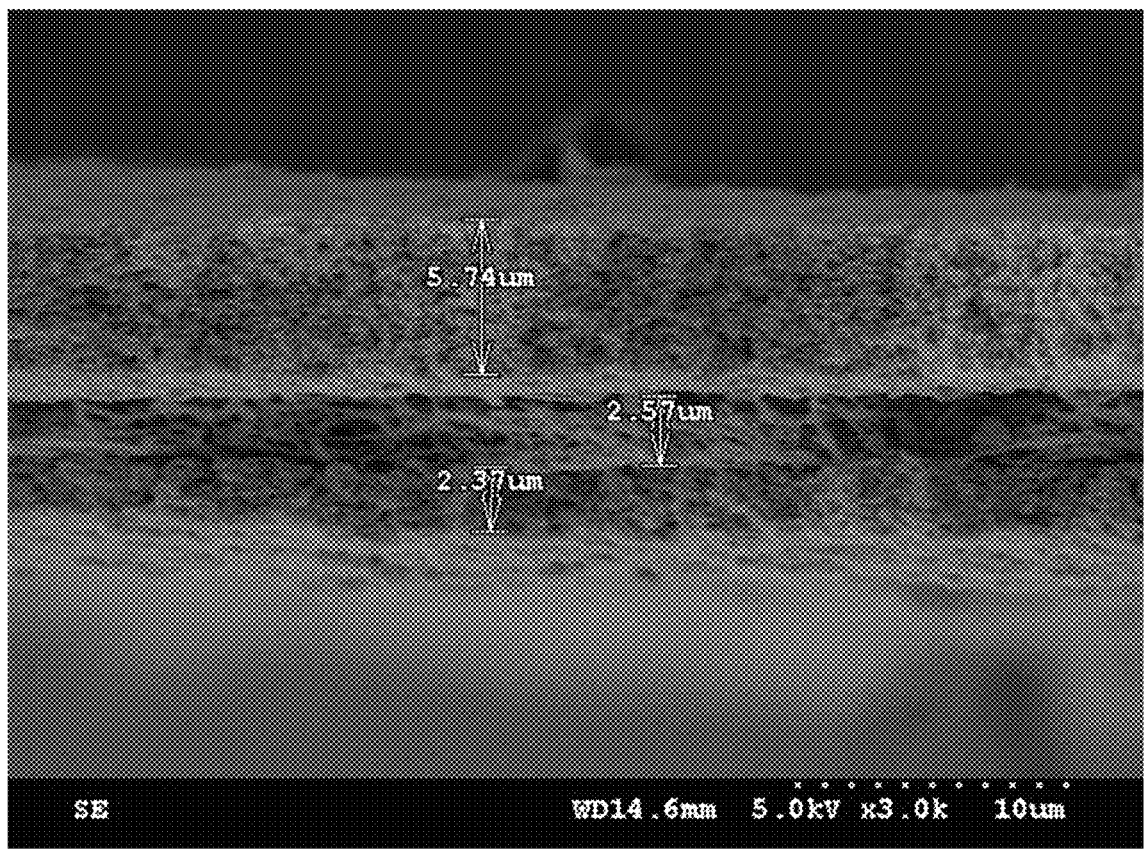
FIG. 5 shows a scanning electron microscope (SEM) image showing the side surface of the electrode manufactured in Preparation Example 1.

The side surface of the electrode manufactured in Example 1 was observed using a scanning electron microscope (SEM) and results are shown in FIG. 5. As can be seen from FIG. 5, a 5.74 μm catalyst layer was formed and a 2.57 μm first region and a 2.37 μm second region were formed, which resulted from permeation of the composition for forming the catalyst layer into the porous support.

Comparative Example 1: Production of Membrane-Electrode Assembly 100 parts by weight of a catalyst, Pt—Ru/C catalyst (commercially available from Tanaka Chemical Corporation) and 900 parts by weight of a PFSA binder (Nafion 5% solution, commercially available from DuPont) and water as a solvent were charged in a vial, followed by stirring and dispersing by ultrasonication, to prepare a composition for forming the catalyst layer.

The prepared composition for forming the catalyst layer was coated on a decal film, followed by drying.

The dried electrode was cut into a suitable size, was arranged on both surfaces of a fluorinated polymer electrolyte membrane (DuPont, Nafion 115 Membrane) and then transferred through application of heat and pressure, and the decal film was removed.

Test Example 1: Evaluation of Performance of Membrane-Electrode Assembly

Figure 6:
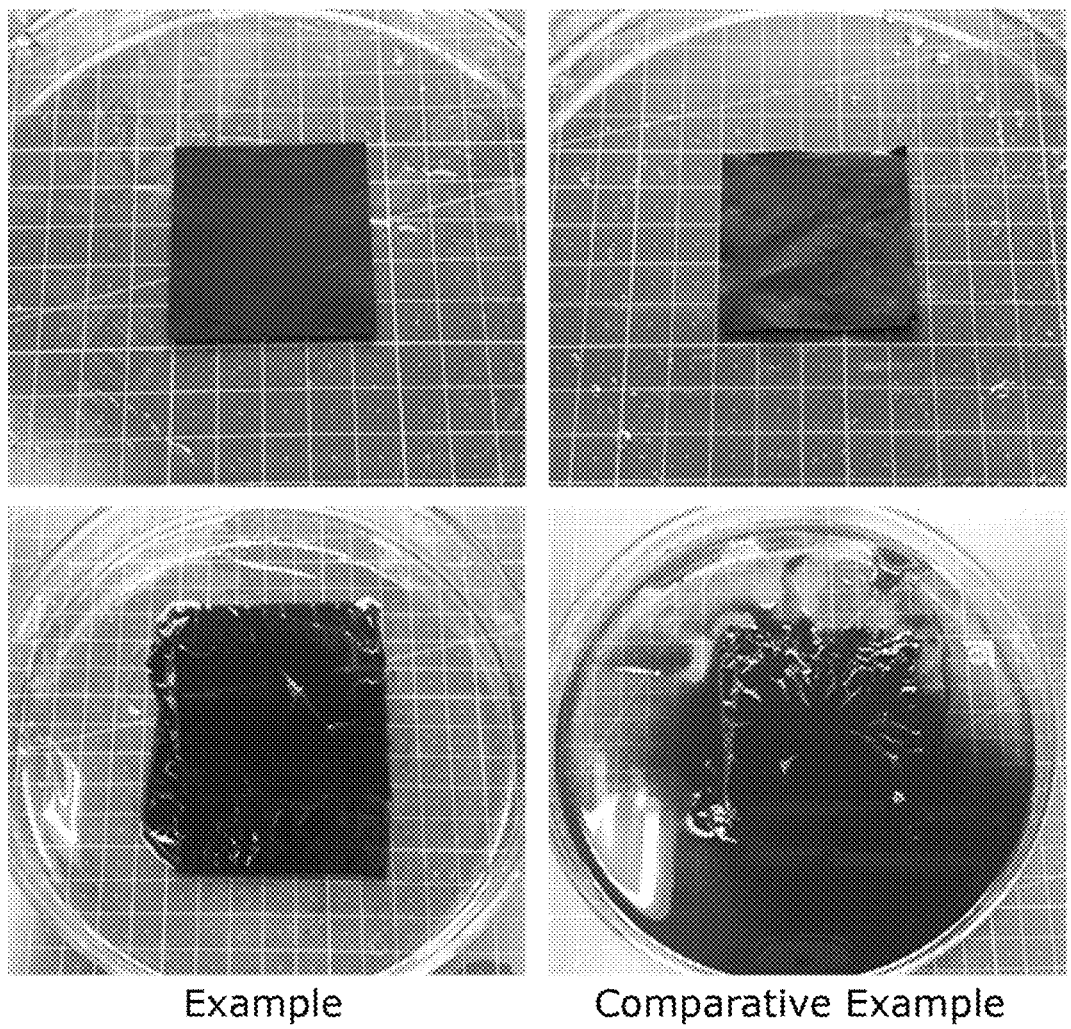
FIG. 6 is an image showing test results of adhesivity of the membrane-electrode assembly manufactured in Test Example 1.

Adhesivity of the membrane-electrode assemblies manufactured in Example and Comparative Example was evaluated by a solvent detachment method (solvent mixture of water and IPA) and results are shown in FIG. 6.

The left upper and lower images of FIG. 6 show before (upper image) and after (lower image) dipping the membrane-electrode assemblies manufactured in Example in a solvent, and the right upper and lower images of FIG. 6 show before (upper image) and after (lower image) dipping the membrane-electrode assemblies manufactured in Comparative Example in a solvent.

As can be seen from results of FIG. 6, the adhesivity of the membrane-electrode assembly manufactured in Example is better than that of the membrane-electrode assembly manufactured in Comparative Example.

INDUSTRIAL APPLICABILITY

The present invention relates to a membrane-electrode assembly for fuel cells, a method of manufacturing the same and a fuel cell system comprising the same. The electrode of the membrane-electrode assembly for fuel cells is a freestanding electrode, and the electrode has excellent adhesivity to the polymer electrolyte membrane and thus can prevent performance deterioration resulting from detachment of the electrode from the polymer electrolyte membrane during operation of fuel cells, and in particular, can secure high durability since the electrode is not readily detached even under harsh operation environments. Using the electrode, the membrane-electrode assembly for fuel cells can be manufactured by a simple process without using any decal film to reduce manufacturing costs.

The invention claimed is:

1. A membrane-electrode assembly for fuel cells comprising:
an anode;
a cathode; and
a polymer electrolyte membrane between the anode and the cathode,
wherein at least one of the anode and the cathode comprises a porous support and a catalyst layer, the porous support disposed between the polymer electrolyte membrane and the catalyst layer,
wherein the at least one of the anode and the cathode includes catalyst particles and a binder resin,
wherein a portion of the catalyst particles and a portion of the binder resin are included in the catalyst layer,
wherein the rest of the catalyst particles are disposed only in a first region of the porous support and the rest of the binder resin is disposed across an entire region of the porous support, such that there is a second region of the porous support where the binder resin exists but the catalyst particles do not exist, and
wherein the second region is disposed between the first region and the polymer electrolyte membrane.

2. The membrane-electrode assembly according to claim 1, wherein a ratio of a total thickness of the catalyst layer and the first region to a thickness of the second region is 1:1 to 10:1.

3. The membrane-electrode assembly according to claim 1, wherein a content of the binder resin in the catalyst layer or the first region is 20 to 40% by weight with respect to the total weight of the catalyst layer or the first region.

4. The membrane-electrode assembly according to claim 1, wherein a mean size of pores of the porous support is 300 nm to 100 nm,
a mean particle diameter of the catalyst particles is 450 nm to 250 nm, and
a mean particle diameter of the binder resin is 250 nm to 50 nm.

5. The membrane-electrode assembly according to claim 1, wherein the porous support comprises an expanded polytetrafluoroethylene (e-PTFE) polymer.

6. The membrane-electrode assembly according to claim 1, wherein the porous support comprises a nanoweb in which nanofibers are integrated in form of a non-woven fabric including a plurality of pores.

7. The membrane-electrode assembly according to claim 6, wherein the nanofibers comprise any one selected from the group consisting of nylon, polyimide, polyaramid, polyetherimide, polyacrylonitrile, polyaniline, poly(ethylene oxide), polyethylene naphthalate, poly(butylene terephthalate), styrene butadiene rubber, polystyrene, polyvinyl chloride, polyvinyl alcohol, polyvinylidene fluoride, polyvinyl butylene, polyurethane, polybenzoxazole, polybenzimidazole, polyamide-imide, polyethylene terephthalate, polyethylene, polypropylene, a copolymer thereof, and a mixture thereof.

8. The membrane-electrode assembly according to claim 6, wherein the nanoweb is manufactured by electrospinning.

9. A method of manufacturing a membrane-electrode assembly for fuel cells comprising:
preparing a composition including catalyst particles and a binder resin;
applying the composition onto a porous support such that (i) a portion of the catalyst particles and a portion of the binder resin remains on the porous support, (ii) the rest of the catalyst particles permeate only to a partial depth of the porous support, and (iii) the rest of the binder resin permeate permeates to an entire depth of the porous support;
in order to form an electrode sheet, drying the composition-applied porous support such that (i) a catalyst layer including the portion of the catalyst particles and the portion of the binder resin is formed on the porous support, (ii) the rest of the catalyst particles are disposed only in a first region of the porous support, the first region being in contact with the catalyst layer, and (iii) there is a second region of the porous support where the binder resin exists but the catalyst particles do not exist; and
bonding the electrode sheet to a polymer electrolyte membrane in such a way that the second region is disposed between the first region and the polymer electrolyte membrane.

10. A fuel cell system comprising:
a fuel supply for supplying a fuel mixture of fuel and water;
a modifier for modifying the fuel mixture to generate a modification gas including hydrogen gas;
a stack comprising the membrane-electrode assembly according to claim 1 and generating electric energy by electrochemical reaction between the modification gas including hydrogen gas supplied from the modifier with an oxidant; and
an oxidant supply for supplying the oxidant to the modifier and the stack.

* * * * *